United States Patent
Zhao et al.

(10) Patent No.: US 11,394,287 B2
(45) Date of Patent: Jul. 19, 2022

(54) ADJUSTABLE POWER SAVE MODE THRESHOLD FOR SWITCHING CONVERTER

(71) Applicant: TEXAS INSTRUMENTS INCORPORATED, Dallas, TX (US)

(72) Inventors: Wei Zhao, Shanghai (CN); Jianzhang Xie, Shanghai (CN); Yihan Yao, Shanghai (CN); Xufeng Wu, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 11 days.

(21) Appl. No.: 16/877,785

(22) Filed: May 19, 2020

(65) Prior Publication Data
US 2021/0211052 A1 Jul. 8, 2021

Related U.S. Application Data

(63) Continuation of application No. PCT/CN2020/070073, filed on Jan. 20, 2020.

(51) Int. Cl.
*H02M 3/158* (2006.01)
*H02M 1/00* (2006.01)
*H02M 1/08* (2006.01)

(52) U.S. Cl.
CPC ....... *H02M 1/0032* (2021.05); *H02M 1/0025* (2021.05); *H02M 3/158* (2013.01); *H02M 1/08* (2013.01)

(58) Field of Classification Search
CPC .... H02M 3/156; H02M 3/158; H02M 1/0025; H02M 1/0032
See application file for complete search history.

(56) References Cited

U.S. PATENT DOCUMENTS 8,283,907 B1 * 10/2012 Jayaraj ............... H02M 3/156
  323/282
10,715,039 B1 * 7/2020 Ilango ............... H02M 3/156
(Continued)

FOREIGN PATENT DOCUMENTS

CN 1926751 A 3/2007
CN 102142771 A 8/2011
(Continued)

OTHER PUBLICATIONS

Search Report for Application No. PCT/CN2020/070073, dated Sep. 28, 2020.

*Primary Examiner* — Alex Torres-Rivera
(74) *Attorney, Agent, or Firm* — Michael T. Gabrik; Charles A. Brill; Frank D. Cimino

(57) ABSTRACT

A system includes an input voltage node configured to provide an input voltage (VIN). The system also includes a load ($R_{LOAD}$) and a switching converter coupled between the input voltage node and the load ($R_{LOAD}$). The switching converter is configured to provide an output voltage (VOUT) to the load ($R_{LOAD}$) based on the input voltage (VIN). The switching converter includes gate driver circuitry and a current mode control circuit coupled to the gate driver circuitry. The current mode control circuit is configured to output control signals to the gate driver circuitry in accordance with different modes of operation, wherein the current mode control circuit is configured to adjust a threshold ($I_{PSM}*$) used to switch between a discontinuous conduction mode (DCM) and a power save mode (PSM).

20 Claims, 14 Drawing Sheets

(56) References Cited

U.S. PATENT DOCUMENTS

| | | | | |
|---|---|---|---|---|
| 2003/0231012 A1* | 12/2003 | Corva | ................... | H02M 3/156 |
| | | | | 323/285 |
| 2008/0030178 A1* | 2/2008 | Leonard | ................ | H02M 3/156 |
| | | | | 323/282 |
| 2011/0018507 A1* | 1/2011 | McCloy-Stevens | ......................... | |
| | | | | H02M 3/1588 |
| | | | | 323/271 |
| 2016/0056663 A1* | 2/2016 | Deng | ................. | H02M 3/1582 |
| | | | | 320/108 |
| 2018/0183331 A1* | 6/2018 | Chen | ..................... | H02M 3/156 |
| 2019/0393796 A1* | 12/2019 | Fukushima | .......... | H02H 7/0827 |
| 2021/0091599 A1* | 3/2021 | Liu | ..................... | H02J 7/00712 |

FOREIGN PATENT DOCUMENTS

| | | |
|---|---|---|
| CN | 109818498 A | 5/2019 |
| EP | 2457317 B1 | 9/2018 |

\* cited by examiner

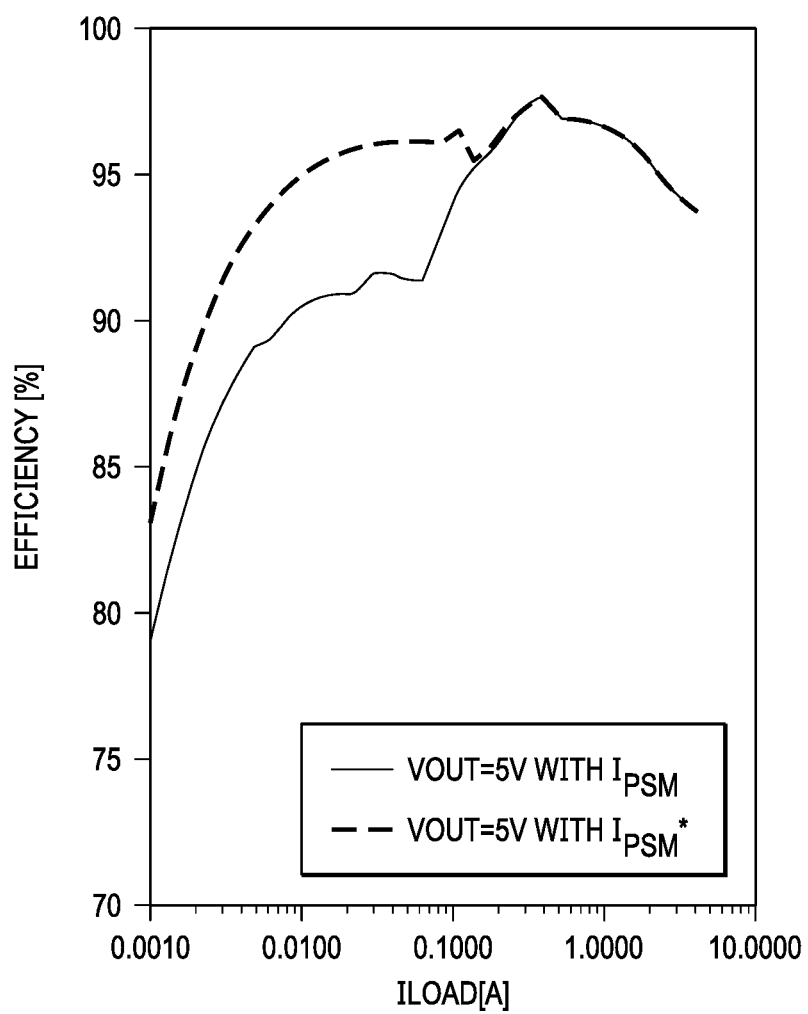

ADJUSTABLE POWER SAVE MODE THRESHOLD FOR SWITCHING CONVERTER

BACKGROUND

The proliferation of consumer electronic devices and integrated circuit (IC) technology has resulted in the commercialization of IC products. As new consumer electronic devices are developed and IC technology advances, new IC products are commercialized. One example IC product that is needed in consumer electronic devices is a switching converter. There are many types of switching converters and output voltage regulation strategies. In one example switching converter, the output voltage is regulated using current mode control and different modes of operation to improve switching converter efficiency in different load conditions. Efforts to further improve switching converter efficiency are ongoing.

SUMMARY

In accordance with at least one example of the disclosure, a system comprises an input voltage node configured to provide an input voltage. The system also comprises a load and a switching converter coupled between the input voltage node and the load. The switching converter is configured to provide an output voltage to the load based on the input voltage. The switching converter comprises gate driver circuitry and a current mode control circuit coupled to the gate driver circuitry. The current mode control circuit is configured to output control signals to the gate driver circuitry in accordance with different modes of operation, wherein the current mode control circuit is configured to adjust a threshold used to switch between a discontinuous conduction mode (DCM) and a power save mode (PSM).

In accordance with at least one example of the disclosure, a control circuit for a switching converter comprises gate drive circuitry and a current mode control circuit coupled to the gate driver circuitry. The current mode control circuit comprises an operational amplifier with a reference voltage input and a feedback voltage input. The current mode control circuit also comprises a voltage-to-current converter coupled to an output of the operational amplifier. The current mode control circuit also comprises a clamp circuit coupled to an output of the voltage-to-current converter. The current mode control circuit also comprises a bias circuit coupled to the clamp circuit to provide a lower clamp value, wherein the lower clamp value is adjustable as a function of an input voltage and an output voltage of the switching converter.

In accordance with at least one example of the disclosure, a switching converter circuit comprises gate driver circuitry and a current mode control circuit coupled to the gate driver circuitry. The current mode control circuit is configured to output control signals to the gate driver circuitry in accordance with different modes of operation, wherein the current mode control circuit is configured to adjust a threshold used to switch between a DCM and a PSM. The current mode control circuit comprises a bias circuit configured to adjust the threshold based on the input voltage and the output voltage. The current mode control circuit also comprises a clamp circuit coupled to the bias circuit, wherein the clamp circuit is configured to clamp an input signal at a lower clamp value based on the threshold.

BRIEF DESCRIPTION OF THE DRAWINGS

For a detailed description of various examples, reference will now be made to the accompanying drawings in which:

FIG. 13A-13C are graphs showing efficiency as a function of load current with and without $I_{PSM}*$ in accordance with some examples.

DETAILED DESCRIPTION

Disclosed herein are switching converter topologies with an adjustable power save mode (PSM) threshold to adjust transitions to and from PSM. In some examples, the adjustable PSM threshold is used in a switching converter with gate driver circuitry and a current mode control circuit coupled to the gate driver circuitry. In some examples, the current mode control circuit is configured to output control signals to the gate driver circuitry in accordance with different modes of operation, where the current mode control circuit is configured to adjust a threshold (sometimes referred to as an adjustable PSM threshold or $I_{PSM}*$ herein) used to switch between a discontinuous conduction mode (DCM) and a power save mode (PSM). More specifically, in some examples, the current mode control circuit includes a bias circuit configured to adjust the threshold based on the input voltage and the output voltage of a switching converter. The current mode control circuit also includes a clamp circuit coupled to the bias circuit, where the clamp circuit is configured to clamp an input signal at a lower clamp value based on the threshold.

In some examples, the input signal to the clamp circuit is based on the output of a first operational amplifier of the current mode control circuit, where the first operational amplifier is configured to compare a reference voltage with a feedback voltage proportional to the output voltage of a switching converter. In some examples, the output of the operational amplifier is converted into the input signal for the clamp circuit using a voltage-to-current converter. The output of the clamp circuit is clamped at a maximum value based an upper clamp threshold and is clamped at a minimum value based on the adjustable PWM threshold. The output of the clamp circuit is compared with an input voltage of a switching converter by a comparator of the current mode control circuit. The output of the comparator along with a switch-off (TOFF) signal is used to generate control signals such as pulse-wide modulation (PWM) signals for the gate driver circuitry. The gate driver circuitry uses the control signals to generate gate drive signals to switches of the switching converter.

In different examples, an adjustable PSM threshold is used with a switching converter corresponding to a buck converter, a boost converter, or buck-boost converter with a current mode control circuit that uses peak current or average current analysis for output voltage regulation. Also, in some examples, the load at the output of the switching converter may be a USB power delivery adapter or wireless charger. To provide a better understanding, various adjustable PSM threshold issues, and related circuits and systems are described using the figures as follows.

Figure 1:
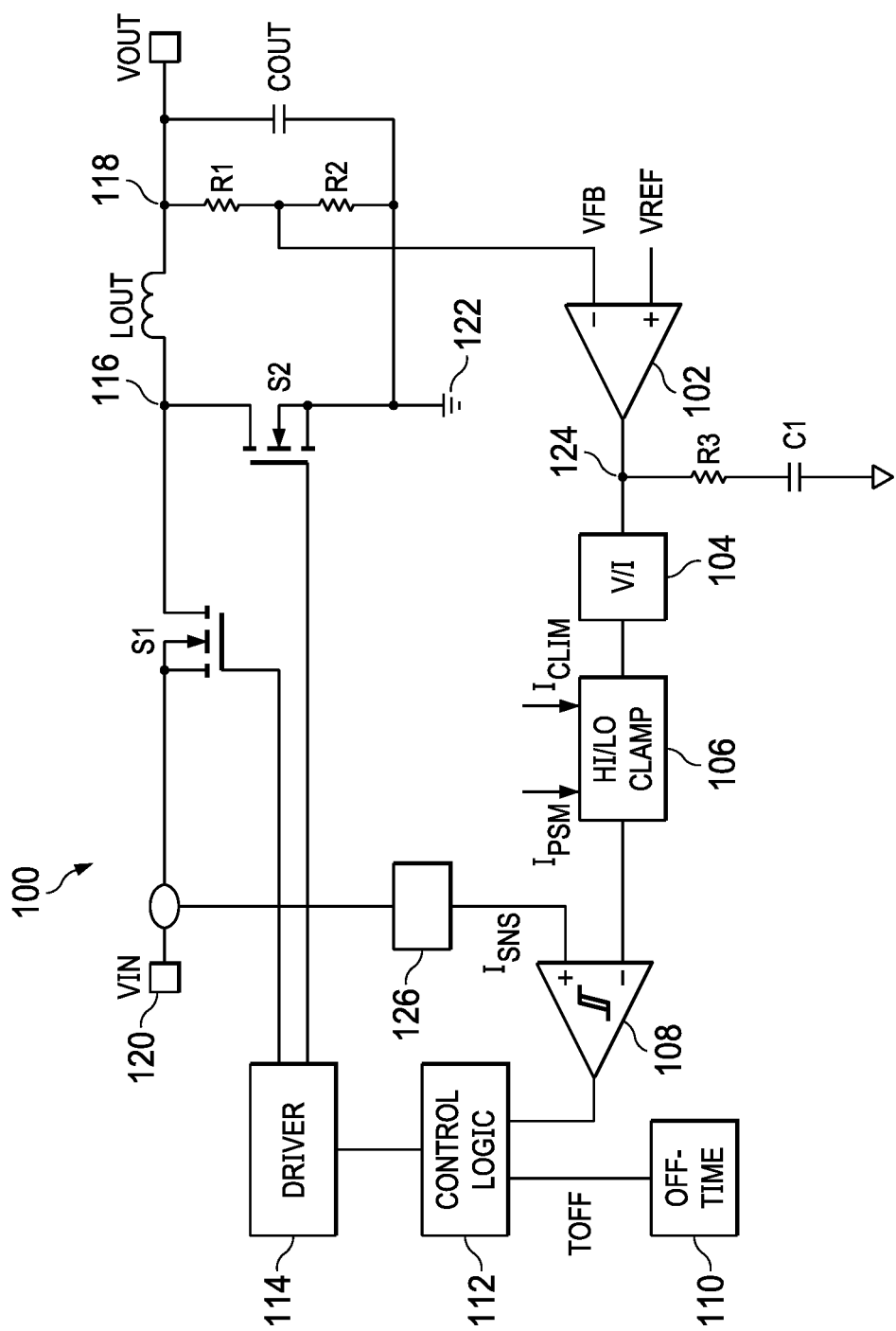
FIG. 1 is diagram of a switching converter in accordance with some examples.

FIG. 1 is diagram of a switching converter 100 in accordance with some examples. In FIG. 1, the switching converter 100 is an example of a buck converter with a fixed PSM threshold ($I_{PSM}$) rather than an adjustable PSM threshold. As shown, the switching converter 100 includes a high-side switch (S1) and a low-side switch (S2) between an input voltage (VIN) node 120 and a ground node 122. Between S1 and S2 is a switch node 116 coupled to an output inductor (LOUT) between the switch node 116 and the output node 118. Also, an output capacitor (COUT) is coupled between the output node 118 and the ground node 122 to store charge and provide an output voltage (VOUT) at the output node 118. VOUT is available for use by a load (not shown).

To direct S1 and S2, the switching converter 100 includes various components including a voltage divider (R1 and R2) configured to provide a feedback voltage (VFB) proportional to VOUT. As shown, VFB and a reference voltage (VREF) are inputs to an operational amplifier 102, where the output of the operational amplifier 102 is a function of VREF-VFB, and is provided to a voltage-to-current converter 104. Also, a resistor (R3) and a capacitor (C1) are coupled between the output node 124 of the operational amplifier 102 and a ground node, where R3 and C1 provide compensation to maintain the loop stability. The voltage-to-current converter 104 outputs a current ramp that is clamped by a clamp circuit 106, where $I_{PSM}$ controls a lower clamp value of the clamp circuit 106, and where a second threshold (ICLIM) controls an upper clamp value of the clamp circuit 106. The output from the clamp circuit 106 is a clamped version of the current ramp output from the voltage-to-current converter 104.

As shown, the output of the clamp circuit 106 is input to a comparator 108, which compares the clamped current from the clamp circuit 106 with a current ramp output from the current sense circuit 126 (a current ramp sensed from the VIN to S1 path). The output of the comparator 108 is provided to control logic 112 configured to provide control signals to the gate driver circuitry 114 based on the output of the comparator 108 and a TOFF signal. The TOFF signal is provided by an off-time circuit 110.

In the example of FIG. 1, the various components (e.g., R1, R2, the operational amplifier 102, R3, C1, the voltage-to-current converter 104, the clamp circuit 106, the comparator 108, the off-time circuit 110, and the control logic 112) used to provide control signals to the gate driver circuitry 114 are part of a current mode control circuit. With $I_{PSM}$, the efficiency of transitions between PSM and another mode (e.g., DCM) suffers, resulting in undesirable power consumption, VOUT ripple and/or other issues.

Figure 2:
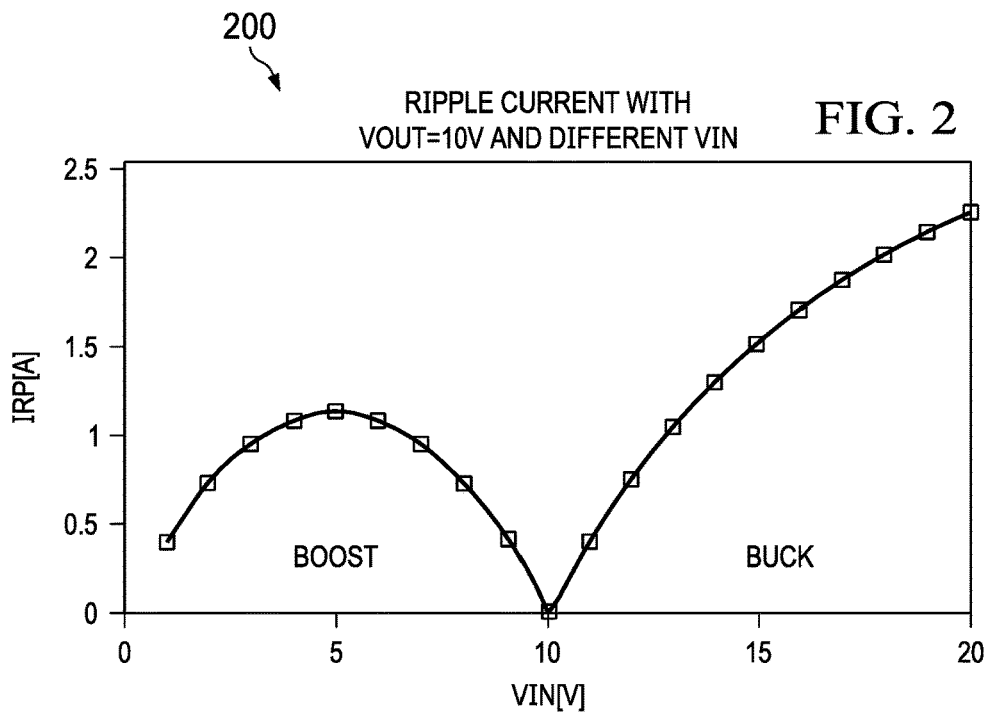
FIG. 2 is a graph showing ripple current as a function of switching converter input voltage and output voltage in accordance with different examples.

FIG. 2 is a graph 200 showing ripple current as a function of switching converter input voltage and output voltage in accordance with different examples. In the example of graph 200, VOUT is set at 10V and VIN varies. As shown, the ripple current varies depending on VIN, where VIN values at less than 10V correspond to boost converter scenarios, and wherein VIN values at 10V or more correspond to buck converter scenarios.

Figure 3:
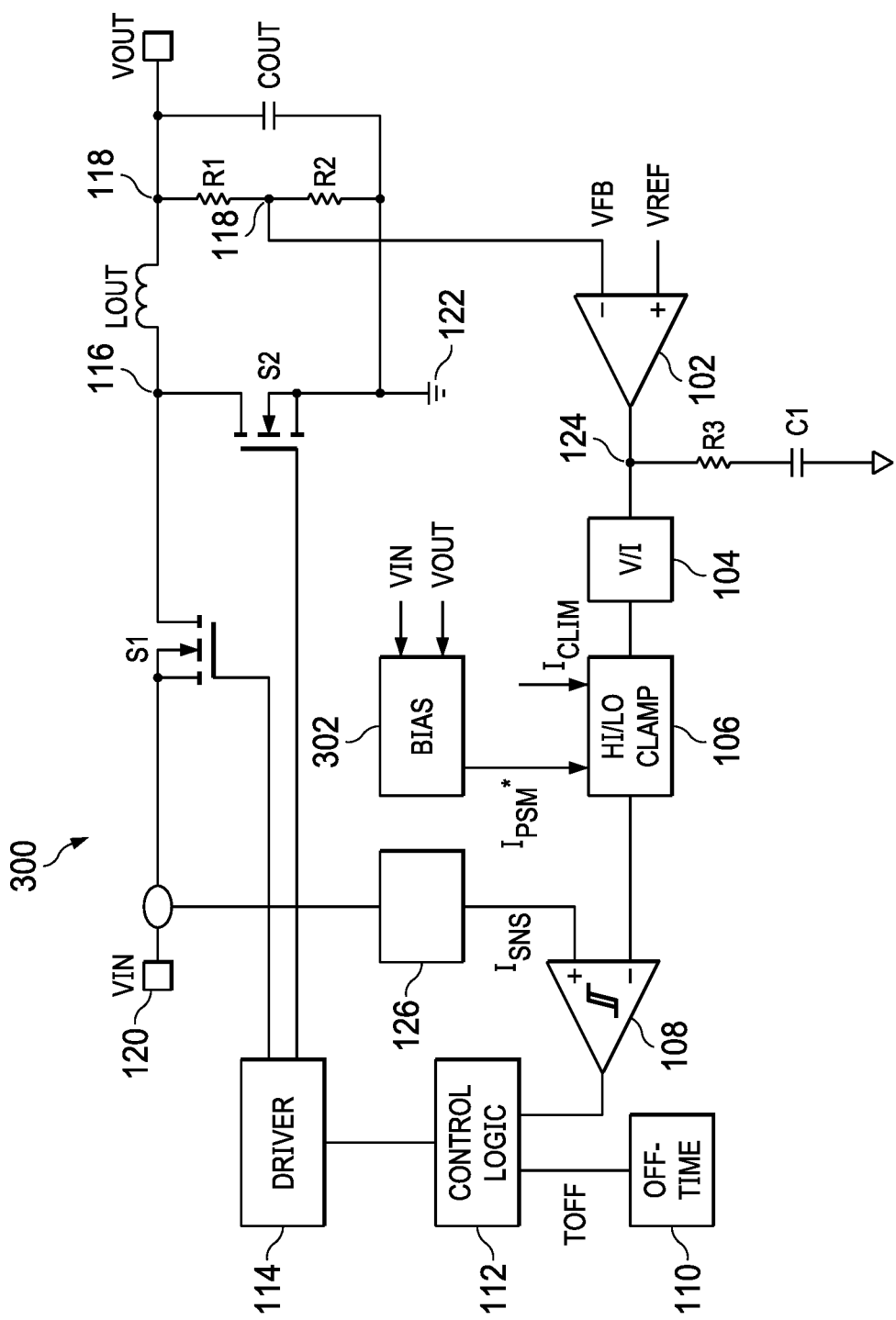
FIG. 3 is a schematic diagram of a switching converter with an adjustable power save mode threshold ($I_{PSM}*$) to transition to and from a power save mode (PSM) in accordance with some examples.

FIG. 3 is a schematic diagram of a switching converter 300 with an adjustable PSM threshold ($I_{PSM}^*$) to transition to and from a PSM in accordance with some examples. As shown, the switching converter 300 includes many of the same components represented for the switching converter 100 of FIG. 1. The difference between the switching converter 300 of FIG. 3 and the switching converter 100 of FIG. 1 is the inclusion of a bias circuit 302 for the switching converter 300, where the bias circuit 302 is configured to provide $I_{PSM}^*$ to the clamp circuit 106. With $I_{PSM}^*$, the efficiency of transitions between a PSM and another mode (e.g., DCM) for the switching converter 300 is improved compared to the switching converter 100 (which uses a fixed $I_{PSM}$), resulting in improved power consumption, reduced VOUT ripple and/or other improvements.

Figure 4:
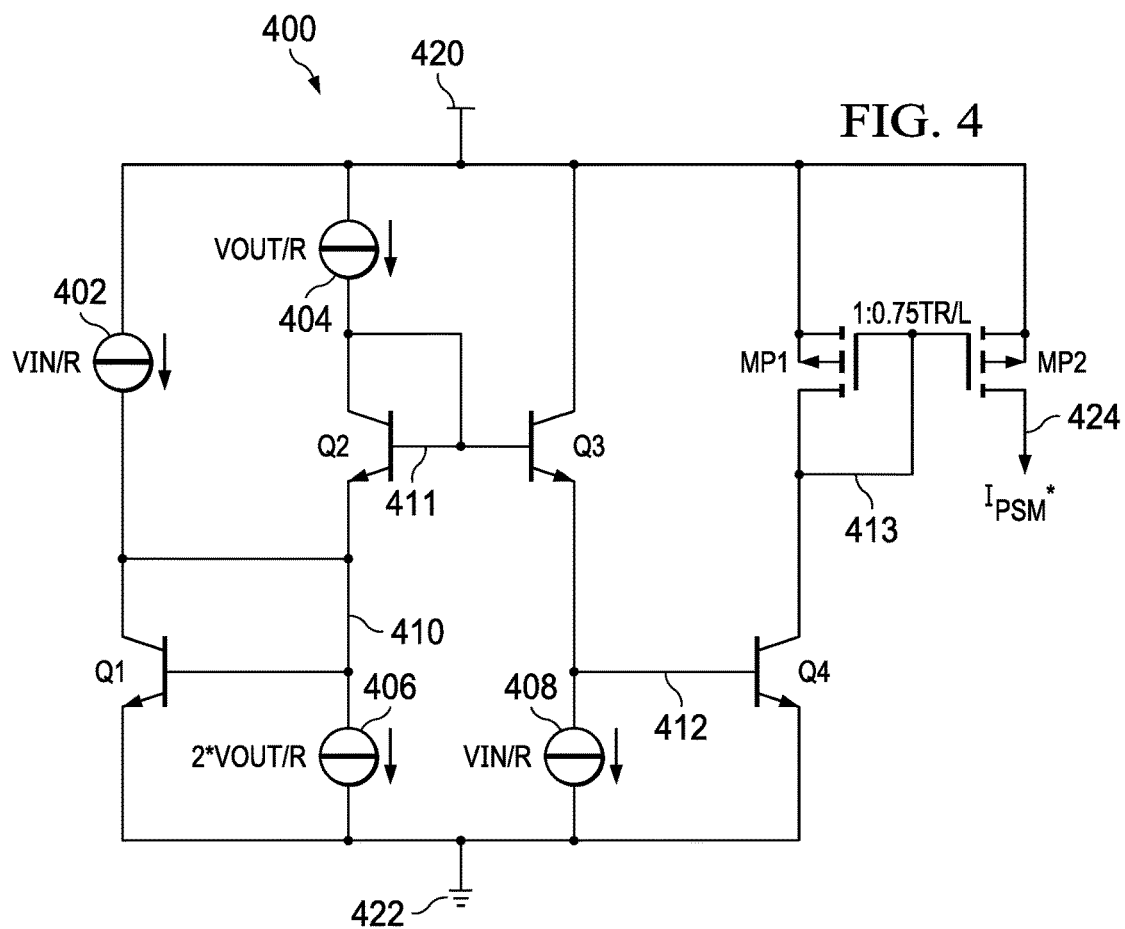
FIG. 4 is a schematic diagram of a bias circuit to provide $I_{PSM}*$ for a buck converter in accordance with some examples.

FIG. 4 is a schematic diagram of a bias circuit 400 (e.g., the bias circuit 302 in FIG. 3) to provide $I_{PSM}^*$ for a buck converter in accordance with some examples. As shown, the bias circuit 400 includes a voltage supply node 420 and a first current source 402 coupled to the voltage supply node 420. The bias circuit 400 also includes a first transistor (Q1) with a first current terminal coupled to the first current source 402 and with a second current terminal coupled to a ground node 422. The bias circuit 400 also includes a second current source 404 coupled to the voltage supply node 420. The bias circuit 400 also includes a second transistor (Q2) with a first current terminal coupled to the second current source 404 and with a second current terminal coupled to the first current terminal and a control terminal of Q1, wherein a control terminal of Q2 is coupled to the first current terminal of Q2. The bias circuit 400 also includes a third current source 406 coupled between the second current terminal of Q2 and the ground node 422.

In the example of FIG. 4, the bias circuit 400 also includes a third transistor (Q3) with a first current terminal coupled to the voltage supply node 420, with a control terminal coupled to the control terminal of Q2, and with a second current terminal. The bias circuit 400 also includes a fourth current source 408 coupled between the second current terminal of Q3 and the ground node 422. The bias circuit 400 also includes a fourth transistor (Q4) with a first current terminal, with a control terminal coupled to the second current terminal of Q3, and with a second current terminal coupled to the ground node 422. The bias circuit also includes a current mirror (formed by MP1 and MP2 in FIG. 4) coupled to the first current terminal of Q4, wherein an output of the current mirror is $I_{PSM}^*$. In some examples, Q1-Q4 are bipolar junction transistors (BJTs), and MP1 and MP2 are PMOS transistors as represented in FIG. 4.

In operation, the bias circuit 400 is configured to adjust $I_{PSM}^*$ based on VIN and VOUT of a switching converter (e.g., the switching converter 300 of FIG. 3). More specifically, when a first current (I1=VIN/R−VOUT/R) from the current source 402 is injected into the collector terminal of Q1, then Q1 generates a base-emitter voltage (VBE1) at the node 410 approximately equal to VT*ln(I1/ISAT), where VT is a thermal voltage of the BJTs and ISAT is a saturation current of the BJTs. When a second current (I2=VOUT/R) from the current source 404 is injected into the collector terminal of Q2, then Q2 generates a base-emitter voltage (VBE2) equal to VT*ln(I2/ISAT). Accordingly, a voltage at the node 411 is approximately equal to VBE1+VBE2, which is approximately equal to VT*[ln(I1*I2)/ISAT/ISAT]. When a third current (I3=VIN/R) is injected by the current source 408 into the collector terminal of Q3, then Q3 generates a base-emitter voltage (VBE3) equal to VT*ln(I3/ISAT). This creates a voltage at the node 412 approximately equal to VBE1+VBE2−VBE3, which is approximately equal to VT*ln(I1*I2/I3/ISAT). A base-emitter voltage of Q4 is VBE4, which equals the voltage present at the node 412. A collector current of Q4 is determined according to VBE4 such that the collector current of Q4 approximately equals ISAT*exp(VBE4/VT), which equals I1*I2/I3. The collector current of Q4 is mirrored to drain of MP2 as $I_{PSM}^*$ with a ratio of 0.75*T*R/L. So $I_{PSM}^*$ equals VAR*T*R/L*I1*I2/I3, which is 0.75*T/L*VOUT*(VIN−VOUT)/VIN, VOUT)/VIN, where T is the switching period of a switching converter (e.g., the switching converter 300 in FIG. 3), L is the inductance of LOUT of a switching converter, and VAR is a variance ratio for T and L. In other words, the bias circuit 400 is configured to provide $I_{PSM}^*$ as $$K * \frac{VOUT(VIN - VOUT)}{VIN},$$

where K is a scaling factor (e.g., based on T, L, and a variance value for T and L).

Figure 5:
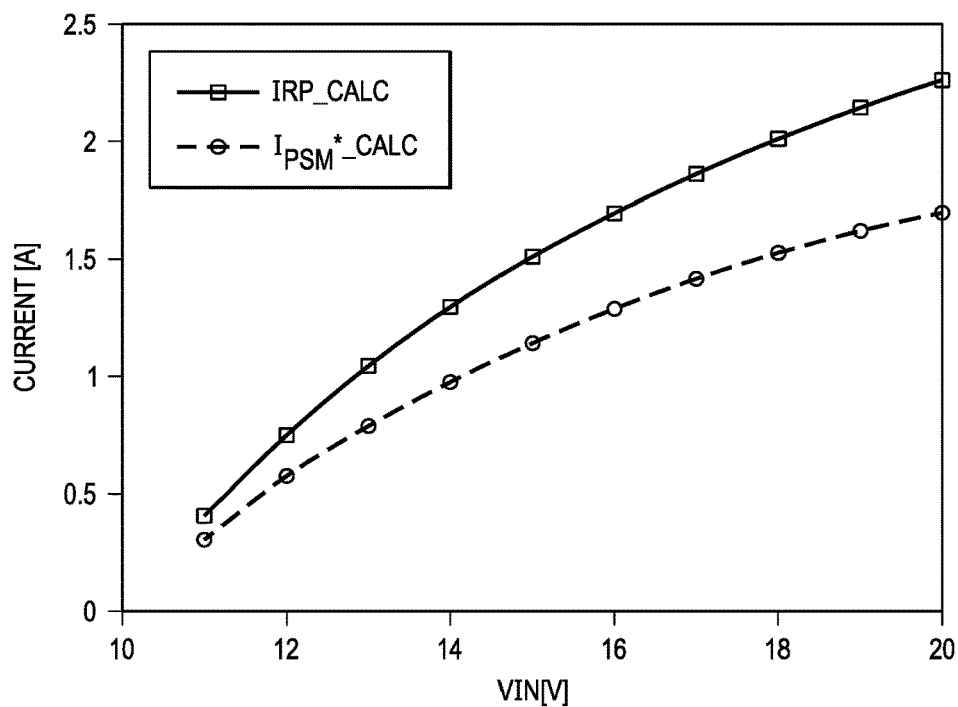
FIG. 5 is a graph showing ripple current and $I_{PSM}*$ as a function of input voltage for a buck converter in accordance with some examples.

FIG. 5 is a graph 500 showing ripple current and $I_{PSM}^*$ as a function of VIN for a buck converter in accordance with some examples. In the graph 500, the ripple current ($I_{RP\_CALC}$) and the $I_{PSM}^*$ ($I_{PSM}^*\_CALC$) are represented as increasing as VIN increases with IRP_CALC higher than $I_{PSM}^*\_CALC$.

Figure 6:
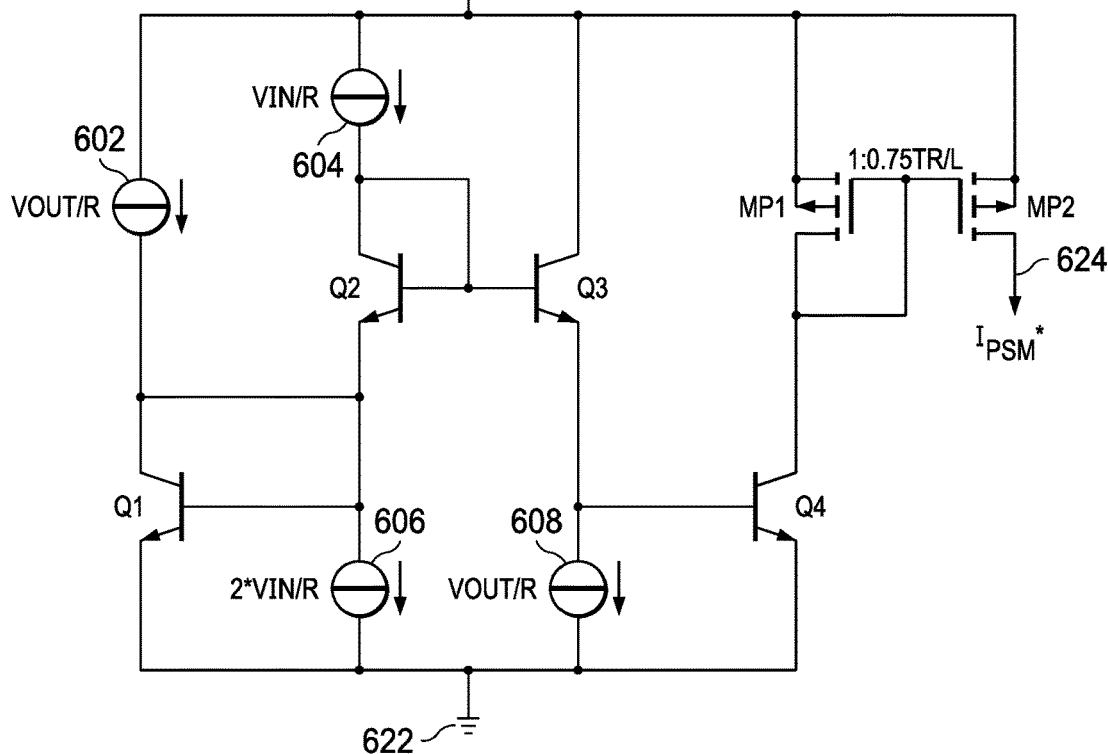
FIG. 6 is a schematic diagram of a bias circuit to provide $I_{PSM}*$ for a boost converter in accordance with some examples.

FIG. 6 is a schematic diagram of a bias circuit 600 to provide $I_{PSM}^*$ for a boost converter in accordance with some examples. As shown, the bias circuit 600 of FIG. 6 is similar to the bias circuit 400 of FIG. 4, except that the current sources 602, 604, 606, and 608 in FIG. 6 provide different currents compared to the similarly positioned current sources 402, 404, 406, and 408 in FIG. 4. More specifically, the current source 602 is coupled to a voltage supply node 620, and provides a first current (I1=VOUT/R−VIN/R). The current source 604 is also coupled to the voltage supply node 620, and provides a second current (I2=VIN/R). The current source 606 is coupled between Q2 and a ground node 422, and provides a third current (I3=2*VIN/R). The current source 608 is coupled between Q3 and the ground node 622, and provides a fourth current (I4=VOUT/R). With the bias circuit 600, $I_{PSM}^*$ is calculated as:

$$I_{PSM}* = \text{variance ratio} \cdot I_{RP} = \text{VAR} \cdot \frac{T \cdot R}{L} \cdot \frac{VIN/R \cdot (VOUT/R - VIN/R)}{VOUT/R},$$

where T is the switching period of a switching converter (e.g., the switching converter 300 in FIG. 3), L is the inductance of LOUT of a switching converter, R is a predetermined resistance value (to generate suitable I1-I3 and to ensure Q1-Q4 operate in the proper region), and VAR is a variance ratio of T and L. In other words, the bias circuit 600 is configured to provide $I_{PSM}^*$ as:

$$I_{PSM}^* = K * \frac{VIN(VOUT - VOUT)}{VOUT},$$

where K is a scaling factor (e.g., based on T, L, and VAR).

Figure 7:
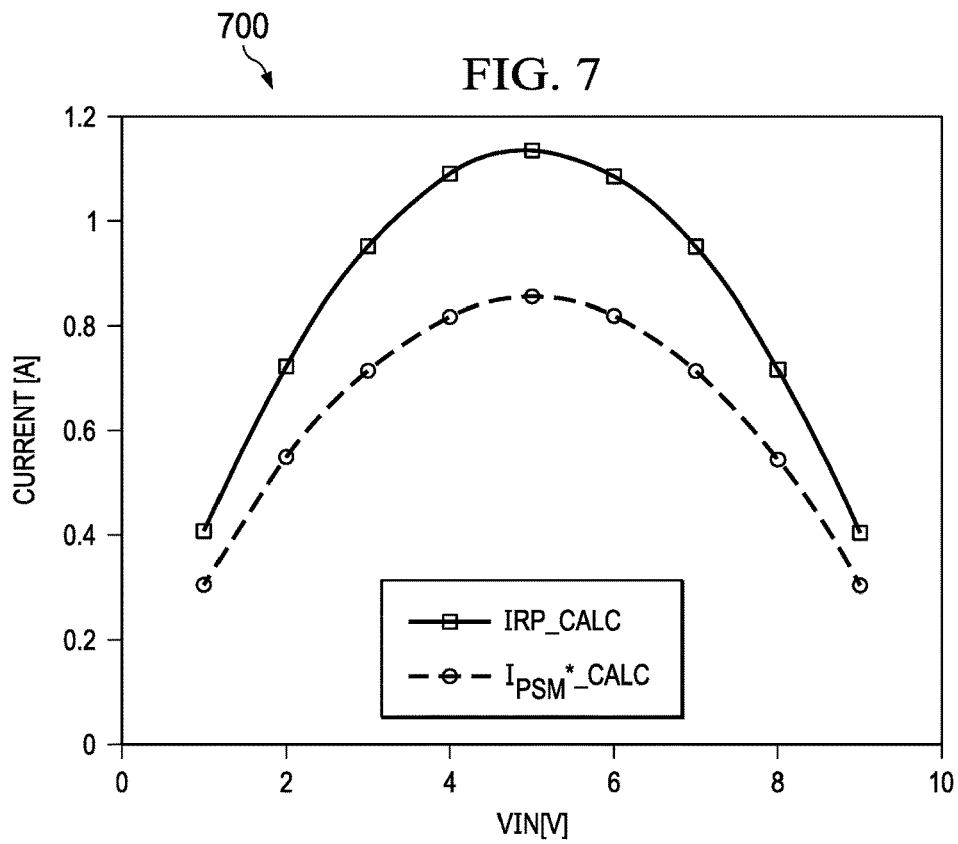
FIG. 7 is a graph showing ripple current and $I_{PSM}*$ as a function of input voltage for a boost converter in accordance with some examples.

FIG. 7 is a graph 700 showing ripple current and $I_{PSM}^*$ as a function of input voltage for a boost converter in accordance with some examples. In the graph 700, the ripple current waveform ($I_{RP}\_CALC$) and the $I_{PSM}^*$ waveform ($I_{PSM}^*\_CALC$) are represented as initially increasing as VIN increases, then decreasing with IRP_CALC higher than $I_{PSM}^*\_CALC$.

Figure 8A:
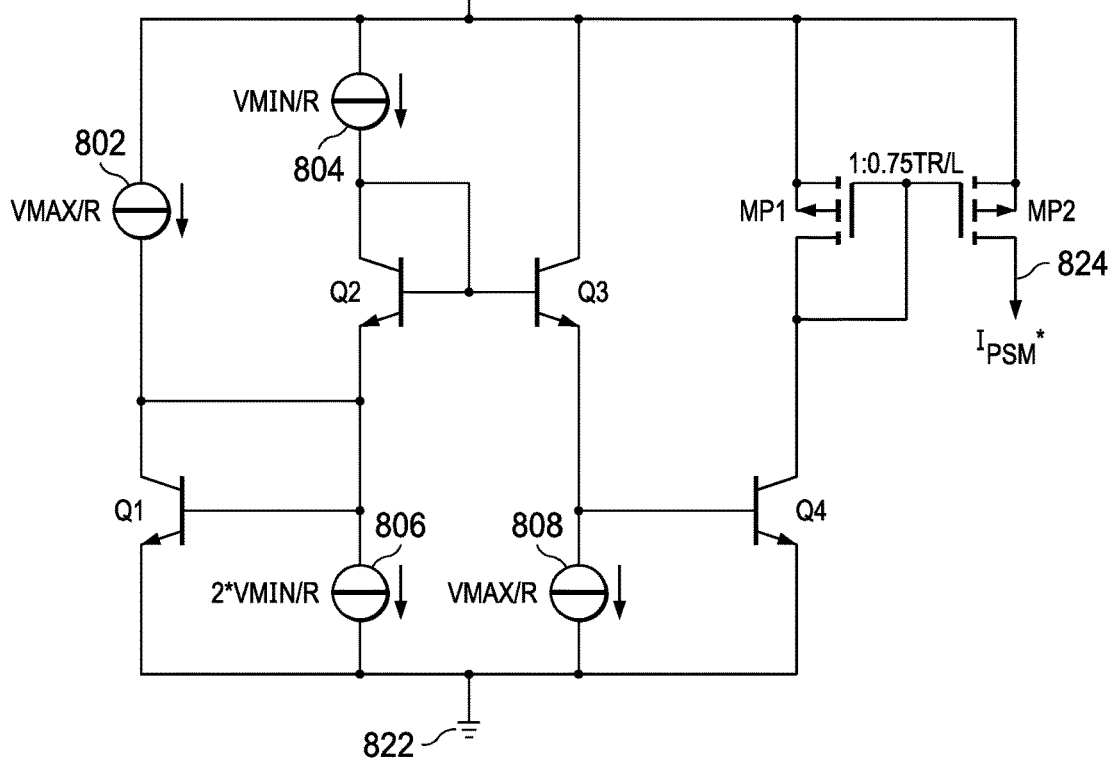
FIG. 8A is a schematic diagram of a bias circuit to provide $I_{PSM}*$ for a buck-boost converter in accordance with some examples.

FIG. 8A is schematic diagram of a bias circuit to provide $I_{PSM}^*$ for a buck-boost converter in accordance with some examples. As shown, the bias circuit 800 of FIG. 8A is similar to the bias circuit 400 of FIG. 4, except that the current sources 802, 804, 806, and 808 in FIG. 8A provide different currents compared to similarly positioned current sources 402, 404, 406, and 408 in FIG. 4. More specifically, the current source 802 is coupled to a voltage supply node 820, and provides a first current (I1=VMAX/R−VMIN/R). The current source 804 is also coupled to the voltage supply node 820, and provides a second current (I2=VMIN/R). The current source 806 is coupled between Q2 and a ground node 822, and provides a third current (I3=2*VMIN/R). The current source 808 is coupled between Q3 and the ground node 822, and provides a fourth current (I4=VMAX/R). With the bias circuit 800, $I_{PSM}^*$ is calculated as:

$$I_{PSM}^* = \text{VAR} \cdot I_{RP} = \text{VAR} \cdot \frac{T \cdot R}{L} \cdot \frac{VMIN/R \cdot (VMAX/R - VMIN/R)}{VMAX/R},$$

where T is the switching period of a switching converter (e.g., the switching converter 300 in FIG. 3), L is the inductance of LOUT of a switching converter, R is a predetermined resistance value (to generate suitable I1-I3 and to ensure Q1-Q4 operate in the proper region), and VAR is a variance ratio of T and L. In other words, the bias circuit 600 is configured to provide $I_{PSM}^*$ as:

$$I_{PSM}^* = K * \frac{VMIN(VMAX - VMIN)}{VMAX},$$

where VMIN is a minimum of VIN and VOUT, VMAX is a maximum of VIN and VOUT, and K is a scaling factor, where K is a scaling factor (e.g., based on T, L, and VAR).

Figure 8B:
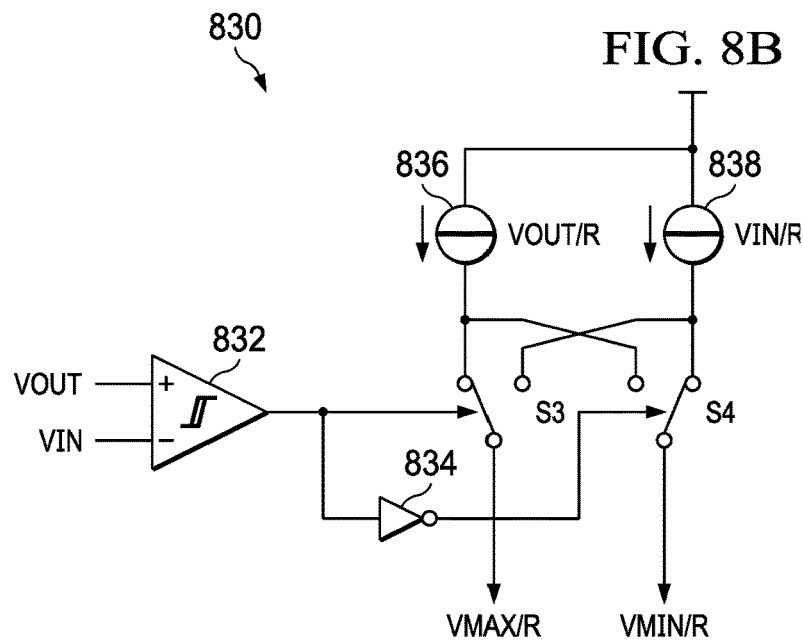
FIG. 8B is a schematic diagram of a current source circuit for the bias circuit of FIG. 8A in accordance with some examples.

FIG. 8B is a schematic diagram of a current source circuit 830 for the bias circuit 800 of FIG. 8A in accordance with some examples. As shown, the current source circuit 830 comprises a comparator 832 configured to compare VOUT and VIN. The output of the comparator 832 controls switches (S3 and S4) in an alternating manner (e.g., using an inverter 834 to invert the signal output from the comparator 832). With the current source circuit 830, a current value (VOUT/R) from the current source 836 is output as VMAX/R when VOUT is higher than VIN. Also, a current value (VIN/R) from the current source 838 is output as VMIN/R when VOUT is higher than VIN. On the other hand, when VOUT is less than VIN, VOUT/R from the current source 836 is output as VMIN/R. Also, VIN/R from the current source 838 is output as VMAX/R when VOUT is less than VIN. The MAX/R and VMIN/R values output by the current source circuit 830 in FIG. 8B are then available for use in the bias circuit 800 of FIG. 8.

Figure 9:
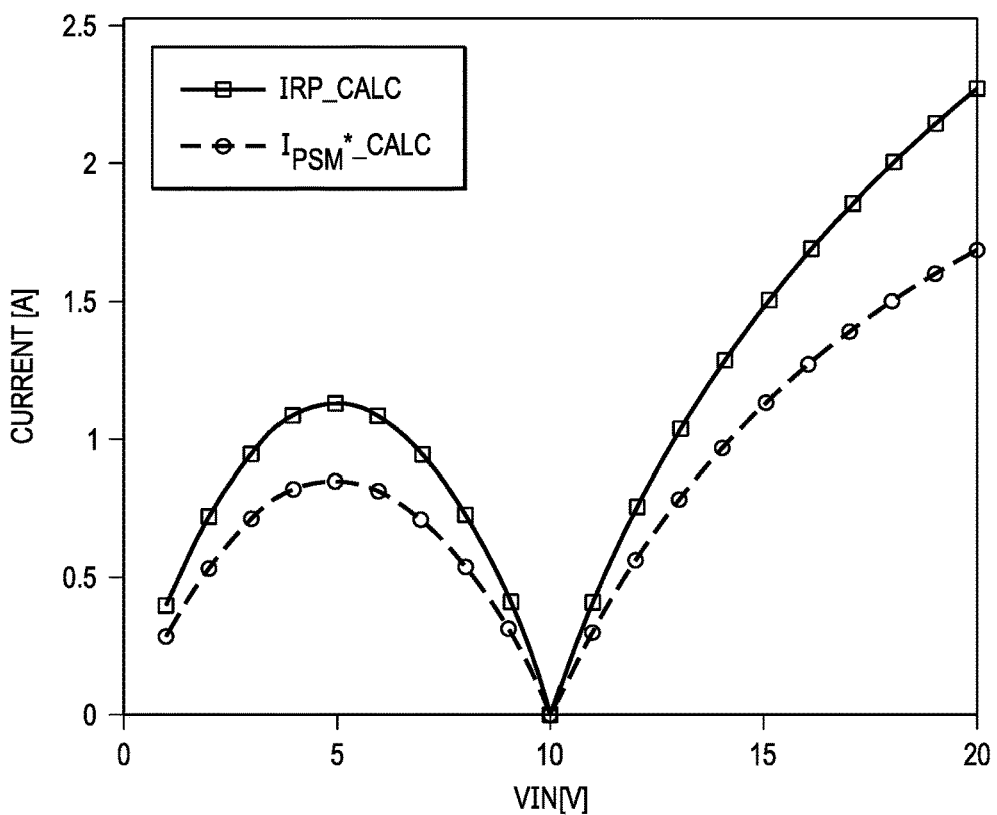
FIG. 9 is a graph showing ripple current and $I_{PSM}*$ as a function of input voltage for a buck-boost converter in accordance with some examples.

FIG. 9 is a graph 900 showing ripple current and $I_{PSM}*$ as a function of input voltage for a buck-boost converter in accordance with some examples. In the graph 900, the ripple current waveform ($I_{RP}$_CALC) and the $I_{PSM}*$ waveform ($I_{PSM}*$_CALC) are represented as initially increasing as VIN increases, then decreasing during a boost scenario until a minimum at VIN=VOUT. As VIN continues to increase, $I_{RP}$_CALC and $I_{PSM}*$_CALC increase during a buck scenario, where IRP_CALC is higher than $I_{PSM}*$_CALC.

Figure 10:
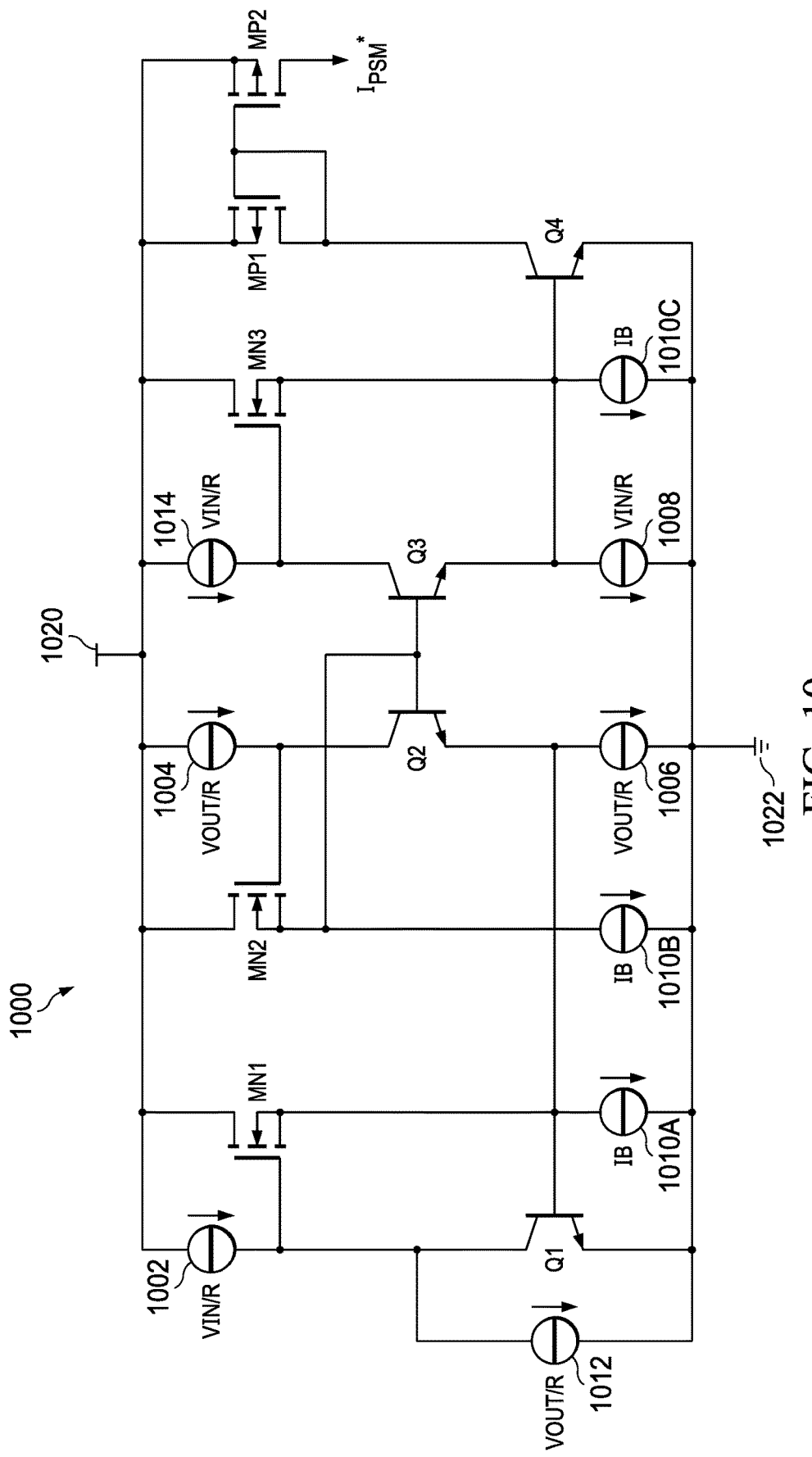
FIG. 10 is a schematic diagram of another bias circuit to provide $I_{PSM}*$ for a boost converter in accordance with some examples.

FIG. 10 is a schematic diagram of another bias circuit 1000 to provide $I_{PSM}*$ for a boost converter in accordance with some examples. As shown, the bias circuit 1000 includes Q1-Q4, current sources 1002, 1004, 1006, and 1008 in the same arrangement as Q1-Q4 and the current sources 402, 404, 406, and 408 in FIG. 4. The bias circuit 1000 also includes a voltage supply node 1020 and a ground node 1022 in the same arrangement as the voltage supply node 420 and the ground node 422 in FIG. 4. In the bias circuit 1000 of FIG. 10, a bias current (IB) and NMOS devices (MN1, MN2, MN3) are added, where IB is provided by currents sources 1010A-1010C. With the arrangement of FIG. 10, IB and MN1-MN3 are used to compensate base current.

Figure 11:
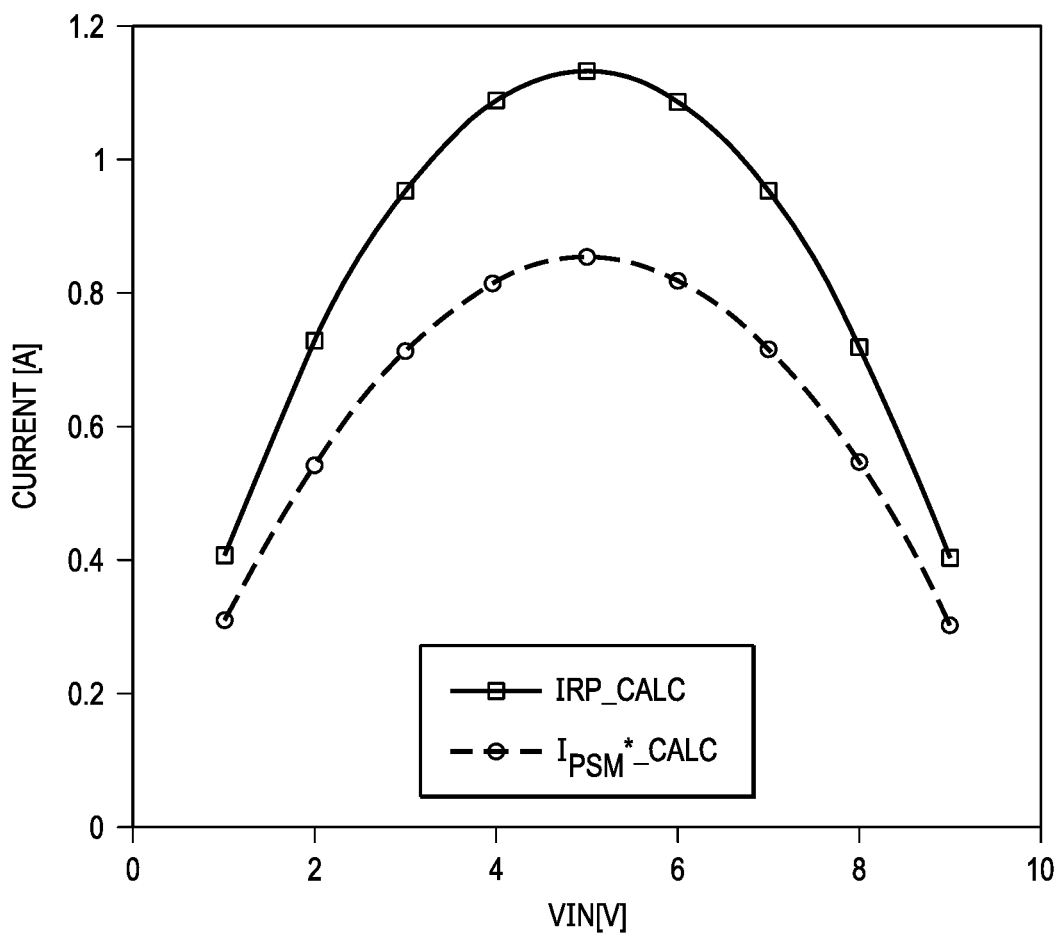
FIG. 11 is a graph showing ripple current and $I_{PSM}*$ as a function of input voltage for a boost converter in accordance with some examples.

FIG. 11 is a graph 1100 showing ripple current and $I_{PSM}*$ as a function of VIN for a buck converter in accordance with some examples. In the graph 1100, the ripple current ($I_{RP}$_CALC) and the $I_{PSM}*$ ($I_{PSM}*$_CALC) are represented as increasing as VIN increases with IRP_CALC higher than $I_{PSM}*$_CALC.

Figure 12A:
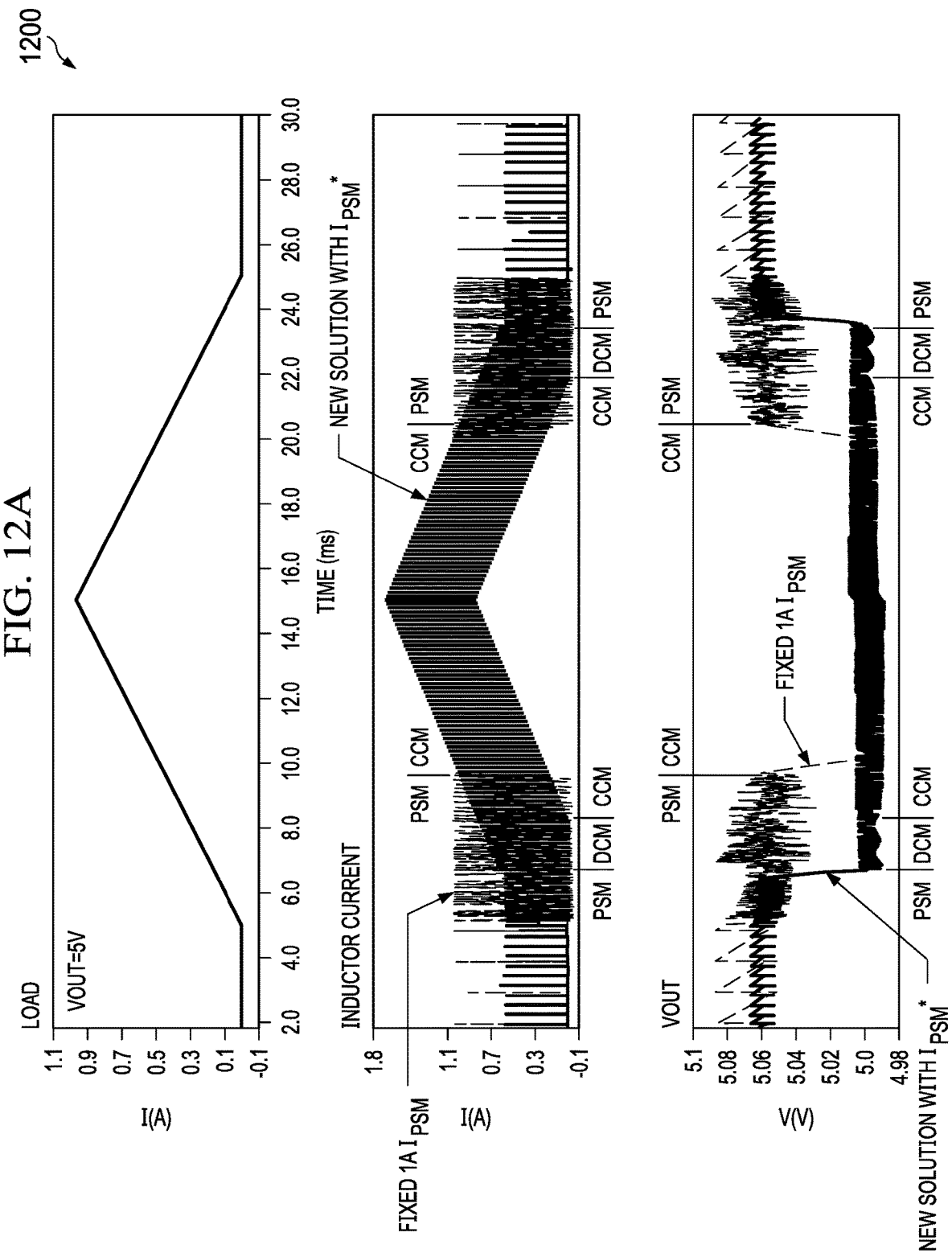
FIGS. 12A-12C are timing diagrams showing mode transitions of a switching converter with and without $I_{PSM}*$ in accordance with some examples.
Figure 12B:
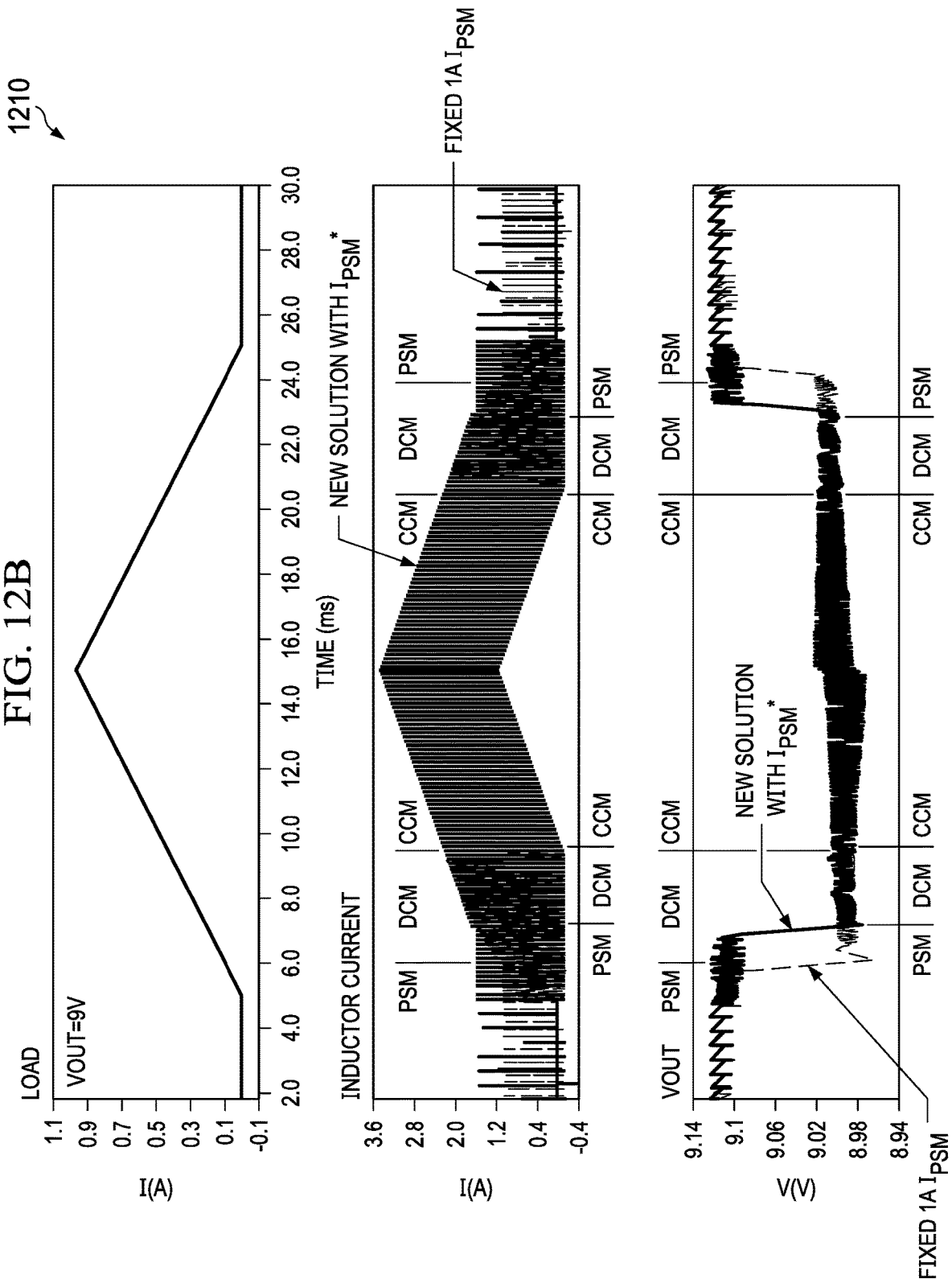
Figure 12C:
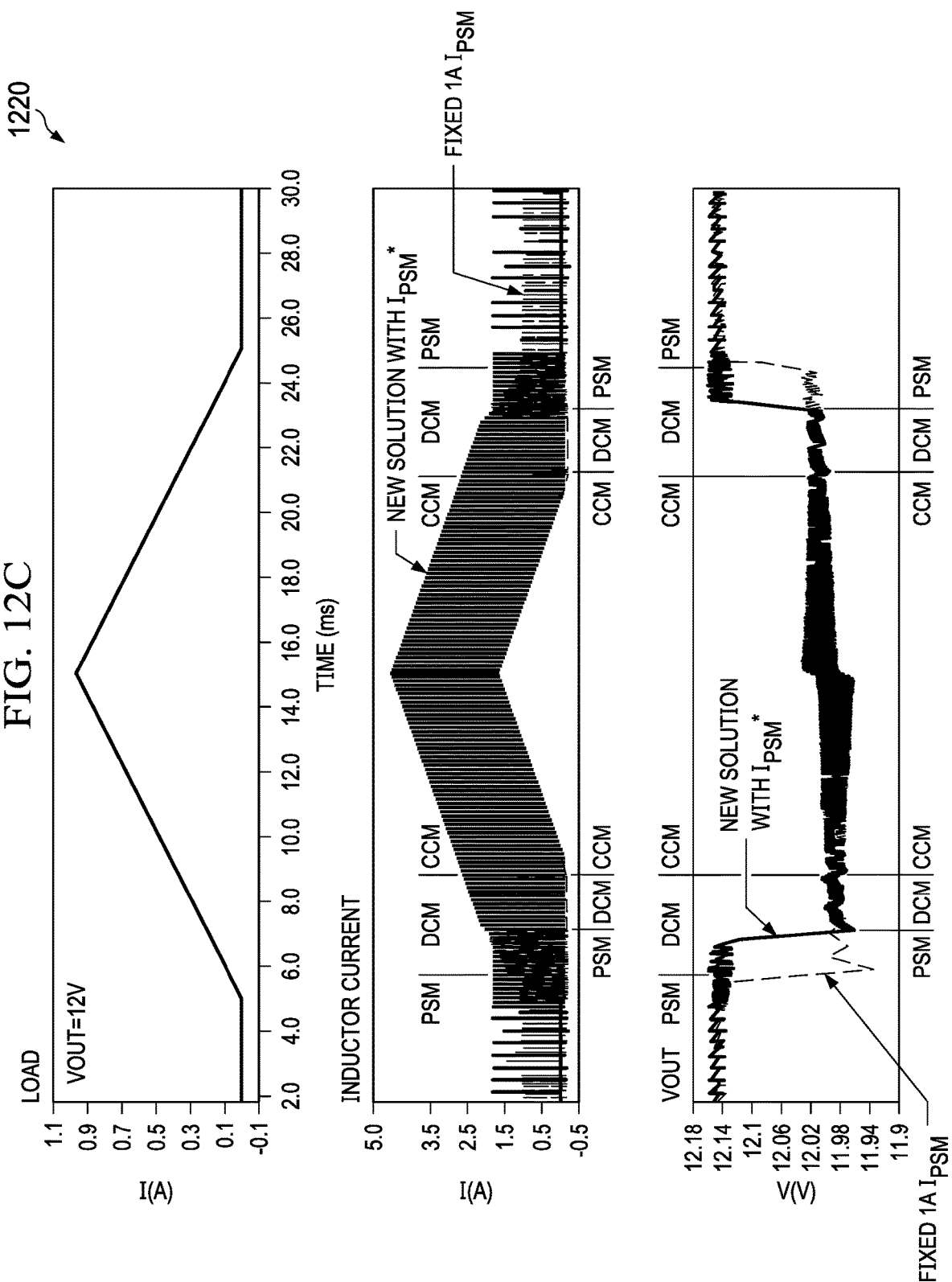

FIGS. 12A-12C are timing diagrams 1200, 1210, and 1220 showing mode transitions of a switching converter with and without an $I_{PSM}*$ in accordance with some examples. In the timing diagram 1200 of FIG. 12A, VOUT is regulated to 5V. In the timing diagram 1210 of FIG. 12B, VOUT is regulated to 9V. In the timing diagram 1220 of FIG. 12C, VOUT is regulated to 12V. In the timing diagrams 1200, 1210, 1220 of FIGS. 12A-12C, VOUT ripple is represented, where the VOUT ripple corresponds to the ac peak-peak VOUT in the different modes (e.g., PSM, DCM, CCM).

Figures 13A, 13B:
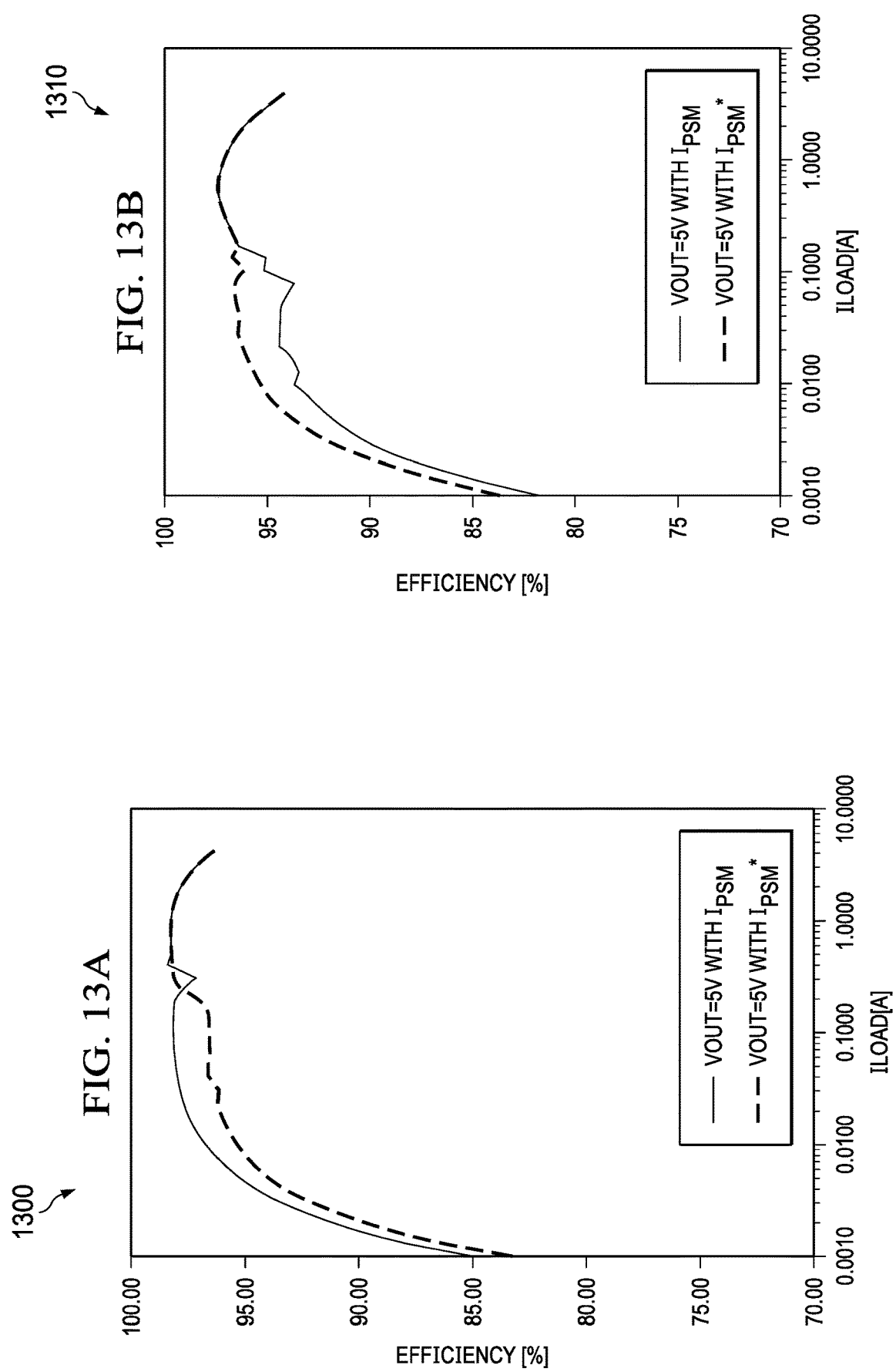

In the example of FIGS. 12A-12C, VOUT variance in PSM and DCM depends on the PSM control method. However, it should be appreciated that with some PSM control methods, VOUT stays the same in PSM and DCM. In the timing diagram 1200 of FIG. 12A and in graph 1300 in FIG. 13A, VOUT ripple is smaller and efficiency is slightly less in PSM for VOUT=5V when $I_{PSM}*$ is used instead of a fixed $I_{PSM}$. In the timing diagram 1210 of FIG. 12B and in graph 1310 in FIG. 13B, VOUT ripple is slightly bigger and efficiency is higher in PSM for VOUT=9V when $I_{PSM}*$ is used instead of a fixed $I_{PSM}$. In the timing diagram 1220 of FIG. 12C and in graph 1320 in FIG. 13C, VOUT ripple is slightly bigger and efficiency is higher in PSM for VOUT=12V when $I_{PSM}*$ is used instead of a fixed $I_{PSM}$.

Figure 14:
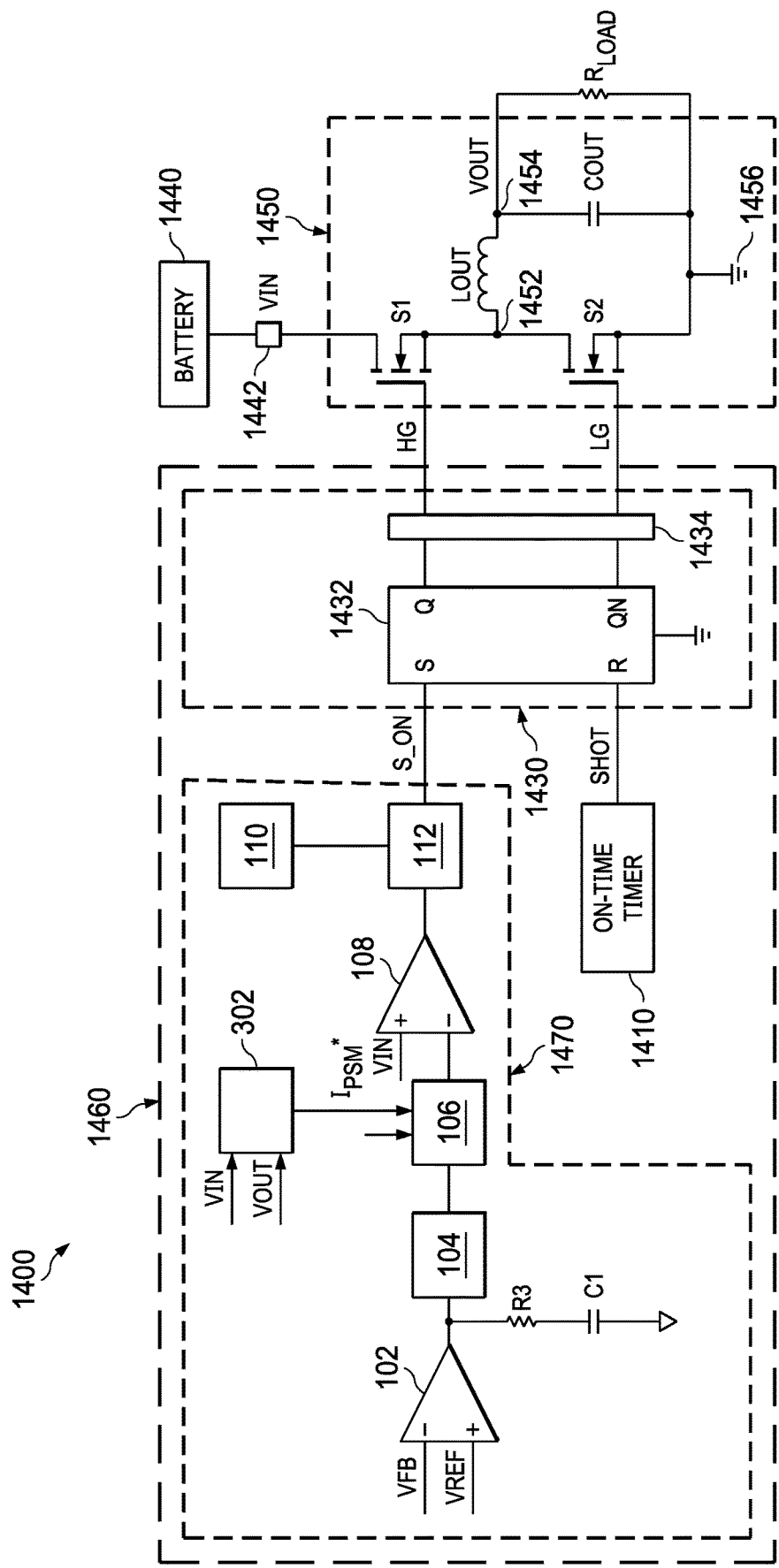
FIG. 14 is a diagram of a system that uses $I_{PSM}*$ in accordance with some examples.

FIG. 14 is a diagram of a system 1400 that uses $I_{PSM}*$ in accordance with some examples. As shown, the system 1400 includes switching converter circuitry 1450 and a control circuit 1460 for one or more power switches (e.g., S1 or S2) of the switching converter circuitry 1450. In the example of FIG. 14, the switching converter circuitry 1450 corresponds to a buck converter topology, where S1 is a high-side switch and S2 is a low-side switch. The switching converter circuitry 1450 also includes an output inductor (LOUT), and an output capacitor (COUT). In other examples, the switching converter circuitry 350 could have a boost converter topology, a buck-boost converter topology, or another switching converter topology.

As shown, S1 and S2 are coupled between a battery 1440 (at VIN node 1442) or other power source configured to provide VIN and a ground node 1456. Also, a first end of LOUT is coupled to a switch node 1452 between S1 and S2. Also, a second end of LOUT is coupled to an output node 1454. Also, COUT and a load (RLOAD) are coupled in parallel between the output node 1454 and the ground node 1456. In a first phase (S1 on, S2 off) of the switching converter circuitry 1450, the inductor current (IL) ramps up. In a second phase (S1 off, S2 on), IL ramps down. To regulate VOUT at the output node 1454, the timing of the first and second phases is controlled by the control circuit 1460. As the VIN provided by the battery 1440 drops and/or as the load varies, the control circuit 1460 adjusts the timing of the first and second phases to account for changes (e.g., by increasing or decreasing the amount of the first phase time subject to certain limits such as a minimum off-time).

In the example of FIG. 14, the timing of the first phase and the second phase are based on a current mode control circuit 1470 that includes various components introduced in FIGS. 1 and 3, including the bias circuit 302, which provides $I_{PSM}*$ as described herein. In different examples, the bias circuit 302 corresponds to the bias circuit 400 in FIG. 4, the bias circuit 600 in FIG. 6, the bias circuit 800 in FIG. 8, or the bias circuit 1000 in FIG. 10. With $I_{PSM}*$, the current mode control circuit 1470 adjusts the transitions between PSM and DCM as a function of VIN and VOUT. The output of the current mode control circuit 1470 is a switch-on signal (S_ON) provided to gate driver circuitry 1430, where the gate driver circuitry 1430 is configured to provide a high-side drive signal (HG) to S1 and to provide a low-side drive signal (LG) to S2.

In some examples, the gate driver circuitry 1430 includes a latch 1432 coupled to a driver circuit 1434. For example, the Q and QN outputs of the latch 1432 can be provided to the driver circuit 1434, which is configured to provide sufficient current to drive S1 and S2. Thus, when the latch 1432 receives S_ON, the gate driver circuitry 1430 directs the switching converter circuitry 1450 to transition to phase 2 (S1 off, S2 on). In some examples, the latch 1432 is an SR latch with a set (S) input node and a reset (R) input node, where the R input node is configured to receive an off-time signal (SHOT) from an on-time timer circuit 1410.

In some examples, a system (e.g., the system 1400 in FIG. 4) includes an input voltage node (e.g., VIN node 1442 in FIG. 14) configured to provide VIN. The system also includes a load (RLOAD) with a variable VOUT range (e.g., 0.8V~36V). In some examples, RLOAD corresponds to a USB power delivery adapter. In other examples, RLOAD corresponds to wireless charger. The system also includes a switching converter (e.g., the switching converter circuitry 1450 and the control circuit 1460 in FIG. 14) coupled between the input voltage node and the load, where the switching converter is configured to provide VOUT to the load based on VIN. The switching converter includes gate driver circuitry (e.g., the gate driver circuitry 1430 in FIG. 14) and a current mode control circuit (e.g., the current mode control circuit 1470 in FIG. 14) coupled to the gate driver circuitry. The current mode control circuit is configured to output control signals (e.g., S_ON in FIG. 14) to the gate driver circuitry in accordance with different modes of operation (e.g., CCM, DCM, and PSM as described herein), wherein the current mode control circuit is configured to adjust a threshold (e.g., $I_{PSM}*$ herein) used to switch between a DCM and PSM.

In some examples, the current mode control circuit 1470 includes a bias circuit (e.g., the bias circuit 302 in FIGS. 3 and 14, the bias circuit 400 in FIG. 4, the bias circuit 600 in FIG. 6, the bias circuit 800 in FIG. 8, the bias circuit 1000 in FIG. 10) configured to adjust the threshold based on VIN and VOUT. The current mode control circuit 1470 also includes a clamp circuit (e.g., the clamp circuit 106 in FIGS. 3 and 14) coupled to the bias circuit, wherein the clamp circuit is configured to clamp an input signal at a lower clamp value based on the threshold.

In some examples, the current mode control circuit also includes a voltage-to-current converter (e.g., the voltage-to-current converter 104 in FIGS. 3 and 14) coupled to the clamp circuit and configured to provide the input signal to the clamp circuit. In some examples, the current mode control circuit also includes an operational amplifier (e.g., the operational amplifier 102 in FIGS. 3 and 14) coupled to voltage-to-current converter, wherein an output of the operational amplifier is provided to the voltage-to-current converter, and wherein the output of the operational amplifier is based on a comparison of a reference voltage (VREF) and a feedback voltage (VFB) proportional to the output voltage.

In some examples, the current mode control circuit also includes a comparator (e.g., the comparator 108 in FIGS. 3 and 14) having: a first input coupled to an output of the clamp circuit; and a second input coupled a current sense circuit coupled to a VIN-S1 path (a path from the voltage supply node 120 to the high-side switch). In some examples, the current mode control circuit also includes an off-time circuit (e.g., the off-time circuit 110 in FIGS. 3 and 14) configured to provide a switch-off signal (TOFF). In some examples, the current mode control circuit also includes control logic (e.g., the control logic 112 in FIGS. 3 and 14) coupled to an output of the comparator and the off-time circuit, wherein an output of the control logic is coupled to the gate driver circuitry.

In some examples, the switching converter is a buck converter, where the current mode control circuit is configured to adjust the threshold based on:

$$K * \frac{VOUT(VIN - VOUT)}{VIN},$$

where VOUT is the output voltage, VIN is the input voltage, and K is a scaling factor. In some examples, the switching converter is a boost converter, where the current mode control circuit is configured to adjust the threshold based on:

$$K * \frac{VIN(VOUT - VOUT)}{VOUT},$$

where VOUT is the output voltage, VIN is the input voltage, and K is a scaling factor. In some examples, the switching converter is a buck-boost converter, where the current mode control circuit is configured to adjust the threshold based on:

$$K * \frac{VMIN(VMAX - VMIN)}{VMAX},$$

where VMIN is a minimum of the input voltage and the output voltage, VMAX is a maximum of the input voltage and the output voltage, and K is a scaling factor.

In some examples, the bias circuit comprises includes a voltage supply node (e.g., the voltage supply nodes 420, 620, 820, or 1020 in FIGS. 4, 6, 8, and 10) and a first current source (e.g., the current sources 402, 602, 802, or 1002 in FIGS. 4, 6, 8, and 10) coupled to the voltage supply node. The bias circuit also includes a first transistor (e.g., Q1 in FIGS. 4, 6, 8, and 10) with a first current terminal coupled to the first current source and with a second current terminal coupled to a ground node (e.g., the ground node 422, 622, 822, or 1022 in FIGS. 4, 6, 8, and 10). The bias circuit also includes a second current source (e.g., the current sources 404, 604, 804, or 1004 in FIGS. 4, 6, 8, and 10) coupled to the voltage supply node. The bias circuit also includes a second transistor (e.g., Q2 in FIGS. 4, 6, 8, and 10) with a first current terminal coupled to the second current source and with a second current terminal coupled to the first current terminal and a control terminal of the first transistor, where a control terminal of the second transistor is coupled to the first current terminal of the second transistor. The bias circuit also includes a third current source (e.g., the current sources 406, 606, 806, or 1006 in FIGS. 4, 6, 8, and 10) coupled between the second current terminal of Q2 and the ground node 422.

In some examples, the bias circuit also includes a third transistor (e.g., Q3 in FIGS. 4, 6, 8, and 10) with a first current terminal coupled to the voltage supply node, with a control terminal coupled to the control terminal of the second transistor, and with a second current terminal. The bias circuit also includes a fourth current source (e.g., the current source 408, 608, 808, or 1008 in FIGS. 4, 6, 8, and 10) coupled between the second current terminal of the third transistor and the ground node. The bias circuit also includes a fourth transistor (e.g., Q4 in FIGS. 4, 6, 8, and 10) with a first current terminal, with a control terminal coupled to the second current terminal of the third transistor, and with a second current terminal coupled to the ground node. The bias circuit also includes a current mirror (e.g., formed by MP1 and MP2 in FIG. 4, 6, 8, or 10) coupled to the first current terminal of the fourth transistor, where an output of the current mirror is $I_{PSM}*$. In some examples, first, second, third, and fourth transistors are BJTs. Also, in some examples, the current mirror is formed by PMOS transistors as represented in FIGS. 4, 6, 8, and 10.

In the proposed examples, an adjustable PSM threshold ($I_{PSM}*$) which tracks ripple current of different VIN and VOUT is used to control transitions between PSM and DCM. This can achieve a good tradeoff between VOUT ripple and efficiency for a switching converter with wide range of VIN and VOUT. The proposed solution is suitable for all current mode DC-DC converters (e.g., peak current mode converters, average current mode converters, buck converters, boost converters, and buck-boost converters.

Certain terms have been used throughout this description and claims to refer to particular system components. As one skilled in the art will appreciate, different parties may refer to a component by different names. This document does not intend to distinguish between components that differ only in name but not in their respective functions or structures. In this disclosure and claims, the terms "including" and "comprising" are used in an open-ended fashion, and thus should be interpreted to mean "including, but not limited to . . . ."

The term "couple" is used throughout the specification. The term may cover connections, communications, or signal paths that enable a functional relationship consistent with the description of the present disclosure. For example, if device A generates a signal to control device B to perform an action, in a first example device A is coupled to device B by direct connection, or in a second example device A is coupled to device B through intervening component C if intervening component C does not alter the functional relationship between device A and device B such that device B is controlled by device A via the control signal generated by device A.

The above discussion is meant to be illustrative of the principles and various embodiments of the present invention. Numerous variations and modifications will become apparent to those skilled in the art once the above disclosure is fully appreciated.

What is claimed is:

1. A system, comprising:
   an input voltage node;
   an output node;
   a switching converter coupled between the input voltage node and the output node, wherein the switching converter is configured to provide an output voltage to the output node based on an input voltage at the input voltage node, and wherein the switching converter comprises:
   gate driver circuitry; and
   a current mode control circuit coupled to the gate driver circuitry and configured to output control signals to the gate driver circuitry in accordance with different modes of operation, wherein the current mode control circuit is configured to adjust a threshold used to switch between a discontinuous conduction mode (DCM) and a power save mode (PSM), the current mode control circuit including a bias circuit configured to adjust the threshold based on the input voltage and the output voltage, and a clamp circuit coupled to the bias circuit, wherein the clamp circuit is configured to clamp an input signal at a lower clamp value based on the threshold.

2. The system of claim 1, wherein the current mode control circuit comprises:
   a voltage-to-current converter coupled to the clamp circuit and configured to provide the input signal to the clamp circuit; and
   an operational amplifier coupled to voltage-to-current converter, wherein an output of the operational amplifier is provided to the voltage-to-current converter, and wherein the output of the operational amplifier is based on a comparison of a reference voltage and a feedback voltage proportional to the output voltage.

3. The system of claim 2, wherein the current mode control circuit further comprises:
   a comparator having:
      a first input coupled to an output of the clamp circuit; and
      a second input coupled to a current sense circuit configured to sense a current along a path from the input voltage node to a high-side switch of the switching converter;
   an off-time circuit configured to provide a switch-off signal; and
   control logic coupled to an output of the comparator and the off-time circuit, wherein an output of the control logic is coupled to the gate driver circuitry.

4. The system of claim 1, wherein the switching converter is a buck converter, and wherein the current mode control circuit is configured to adjust the threshold based on:

$$K * \frac{VOUT(VIN - VOUT)}{VIN},$$

where VOUT is the output voltage, VIN is the input voltage, and K is a scaling factor.

5. The system of claim 1, wherein the switching converter is a boost converter, and wherein the current mode control circuit is configured to adjust the threshold based on:

$$K * \frac{VIN(VOUT - VIN)}{VOUT},$$

where VOUT is the output voltage, VIN is the input voltage, and K is a scaling factor.

6. The system of claim 1, wherein the switching converter is a buck-boost converter, and wherein the current mode control circuit is configured to adjust the threshold based on:

$$K * \frac{VMIN(VMAX - VMIN)}{VMAX},$$

where VMIN is a minimum of the input voltage and the output voltage, VMAX is a maximum of the input voltage and the output voltage, and K is a scaling factor.

7. The system of claim 1, wherein the bias circuit comprises:
   a voltage supply node;
   a first current source coupled to the voltage supply node;
   a first transistor with a first current terminal coupled to the first current source and with a second current terminal coupled to a ground node;
   a second current source coupled to the voltage supply node;
   a second transistor with a first current terminal coupled to the second current source and with a second current terminal coupled to the first current terminal and a control terminal of the first transistor, wherein a control terminal of the second transistor is coupled to the first current terminal of the second transistor; and
   a third current source coupled between the second current terminal of the second transistor and the ground node.

8. The system of claim 7, wherein the bias circuit further comprises:
   a third transistor with a first current terminal coupled to the voltage supply node, with a control terminal coupled to the control terminal of the second transistor, and with a second current terminal;
   a fourth current source coupled between the second current terminal of the third transistor and the ground node;
   a fourth transistor with a first current terminal, with a control terminal coupled to the second current terminal of the third transistor, and with a second current terminal coupled to the ground node; and
   a current mirror coupled to the first current terminal of the fourth transistor, wherein an output of the current mirror is the threshold.

9. The system of claim 1, further comprising a load coupled to the output node, wherein the load comprises a USB power delivery adapter.

10. The system of claim 1, further comprising a load coupled to the output node, wherein the load comprises a wireless charger.

11. A control circuit for a switching converter, the control circuit comprising:
  gate driver circuitry; and
  a current mode control circuit coupled to the gate driver circuitry, wherein the current mode control circuit comprises:
    an operational amplifier with a reference voltage input and a feedback voltage input;
    a voltage-to-current converter coupled to an output of the operational amplifier;
    a clamp circuit coupled to an output of the voltage-to-current converter;
    a bias circuit coupled to the clamp circuit to provide a lower clamp value, wherein the lower clamp value is adjustable as a function of an input voltage and an output voltage of the switching converter.

12. The control circuit of claim 11, wherein the current mode control circuit further comprises:
  a comparator having:
    a first input coupled to an output of the clamp circuit; and
    a second input coupled to a current ramp sensed from an input voltage node to high-side switch path of the switching converter; and
  control logic coupled to an output of the comparator and an off-time circuit, wherein an output of the control logic is coupled to the gate driver circuitry.

13. The control circuit of claim 11, wherein the bias circuit comprises:
  a voltage supply node;
  a first current source coupled to the voltage supply node;
  a first transistor with a first current terminal coupled to the first current source and with a second current terminal coupled to a ground node;
  a second current source coupled to the voltage supply node;
  a second transistor with a first current terminal coupled to the second current source and with a second current terminal coupled to the first current terminal and a control terminal of the first transistor, wherein a control terminal of the second transistor is coupled to the first current terminal of the second transistor; and
  a third current source coupled between the second current terminal of the second transistor and the ground node.

14. The control circuit of claim 13, wherein the bias circuit further comprises:
  a third transistor with a first current terminal coupled to the voltage supply node, with a control terminal coupled to the control terminal of the second transistor, and with a second current terminal;
  a fourth current source coupled between the second current terminal of the third transistor and the ground node;
  a fourth transistor with a first current terminal, with a control terminal coupled to the second current terminal of the third transistor, and with a second current terminal coupled to the ground node; and
  a current mirror coupled to the first current terminal of the fourth transistor, wherein an output of the current mirror is the lower clamp value.

15. A switching converter, comprising:
  gate driver circuitry; and
  a current mode control circuit coupled to the gate driver circuitry and configured to output control signals to the gate driver circuitry in accordance with different modes of operation, wherein the current mode control circuit is configured to adjust a threshold used to switch between a discontinuous conduction mode (DCM) and a power save mode (PSM), wherein the current mode control circuit comprises:
    a bias circuit configured to adjust the threshold based on input voltage and output voltage of the switching converter; and
    a clamp circuit coupled to the bias circuit, wherein the clamp circuit is configured to clamp an input signal at a lower clamp value based on the threshold.

16. The switching converter of claim 15, wherein the current mode control circuit comprises:
  a voltage-to-current converter coupled to the clamp circuit and configured to provide the input signal to the clamp circuit; and
  an operational amplifier coupled to voltage-to-current converter, wherein an output of the operational amplifier is provided to the voltage-to-current converter, and wherein the output of the operational amplifier is based on a comparison of a reference voltage and a feedback voltage proportional to the output voltage.

17. The switching converter of claim 16, wherein the current mode control circuit further comprises:
  a comparator having:
    a first input coupled to an output of the clamp circuit; and
    a second input coupled to a current ramp sensed from an input voltage node to high-side switch path of the switching converter;
  an off-time circuit configured to provide a switch-off signal; and
  control logic coupled to an output of the comparator and the off-time circuit, wherein an output of the control logic is coupled to the gate driver circuitry.

18. The switching converter of claim 15, wherein the switching converter is a buck converter, and wherein the bias circuit is configured to adjust the threshold based on:

$$K * \frac{VOUT(VIN - VOUT)}{VIN},$$

where VOUT is the output voltage, VIN is the input voltage, and K is a scaling factor.

19. The switching converter of claim 15, wherein the switching converter is a boost converter, and wherein the bias circuit is configured to adjust the threshold based on:

$$K * \frac{VIN(VOUT - VIN)}{VOUT},$$

where VOUT is the output voltage, VIN is the input voltage, and K is a scaling factor.

20. The switching converter of claim 15, wherein the switching converter is a buck-boost converter, and wherein the bias circuit is configured to adjust the threshold based on:

$$K * \frac{VMIN(VMAX - VMIN)}{VMAX},$$

where VMIN is a minimum of the input voltage and the output voltage, VMAX is a maximum of the input voltage and the output voltage, and K is a scaling factor.

* * * * *